United States Patent
Potter et al.

(10) Patent No.: US 7,389,795 B2
(45) Date of Patent: Jun. 24, 2008

(54) VALVE ASSEMBLY

(75) Inventors: Laurence John Potter, Moseley (GB); Edward Gilbert Shaw, Inkberrow (GB)

(73) Assignee: Haldex Brake Products Ltd. (GB)

( * ) Notice: Subject to any disclaimer, the term of this patent is extended or adjusted under 35 U.S.C. 154(b) by 0 days.

(21) Appl. No.: 11/680,182

(22) Filed: Feb. 28, 2007

(65) Prior Publication Data

US 2007/0186985 A1  Aug. 16, 2007

Related U.S. Application Data

(63) Continuation of application No. PCT/GB2005/003128, filed on Aug. 10, 2005.

(30) Foreign Application Priority Data

Aug. 28, 2004  (GB)  ................................. 0419239.9

(51) Int. Cl.
*F15B 13/043*  (2006.01)

(52) U.S. Cl. ........................... 137/625.64; 137/625.66; 137/625.68

(58) Field of Classification Search .................. 137/12, 137/596.16, 596.18, 625.6, 625.64–625.68, 137/625.25

See application file for complete search history.

(56) References Cited

U.S. PATENT DOCUMENTS

| 3,181,917 | A | * | 5/1965 | Dobrikin et al. ............... 303/40 |
| 3,217,745 | A | * | 11/1965 | Tate, Jr. .................. 137/596.18 |
| 3,814,134 | A | * | 6/1974 | Vanti ........................ 137/627.5 |
| 3,944,294 | A | * | 3/1976 | Masuda et al. ................ 303/40 |
| 4,561,464 | A | * | 12/1985 | Frantz .................... 137/596.18 |
| 5,429,426 | A | * | 7/1995 | Hart ............................. 303/33 |
| 5,538,336 | A | | 7/1996 | Reuter et al. ............. 303/119.2 |
| 5,782,267 | A | | 7/1998 | Yoo ....................... 137/596.17 |
| 6,062,260 | A | * | 5/2000 | Yoshimura et al. .... 137/596.16 |
| 7,147,006 | B2 | * | 12/2006 | Shaw et al. .............. 137/627.5 |
| 2004/0011411 | A1 | * | 1/2004 | Thordarson et al. ........ 137/613 |

FOREIGN PATENT DOCUMENTS

| DE | 32 40 277 | 5/1984 |
| WO | 92/16400 | 10/1992 |
| WO | 03/031855 | 4/2003 |

OTHER PUBLICATIONS

International Search Report, Sep. 29, 2005, 2 pages for PCT/GB2005/003128.
United Kingdom Search Report, Jan. 26, 2005, 1 page for GB0419239.9.

* cited by examiner

*Primary Examiner*—John Rivell
*Assistant Examiner*—Craig M Schneider
(74) *Attorney, Agent, or Firm*—St. Onge Steward Johnston & Reens LLC (57) ABSTRACT

A valve assembly comprising a valve body, a first movable pressure responsive element, and a second pressure responsive movable element, wherein the valve assembly further comprises a resilient biasing element and a movable third pressure responsive element, the resilient biasing element extending between the third pressure responsive element and the valve body and the third pressure responsive element being adapted to act on both the first and second pressure responsive elements to transmit the biasing force of the resilient biasing element to both the first and second pressure responsive elements.

12 Claims, 4 Drawing Sheets

VALVE ASSEMBLY

CROSS-REFERENCE TO RELATED APPLICATIONS

The present application is a continuation of pending International patent application PCT/GB2005/003128 filed on Aug. 10, 2005 which designates the United States and claims priority from United Kingdom patent application 0419239.9 filed on Aug. 28, 2004, the content of which is incorporated herein by reference.

FIELD OF THE INVENTION

The invention relates to a valve assembly having electrical means for controlling fluid pressure relative to a working volume in three controls states. The control states may apply, hold or release fluid pressure relative to the working volume. The valve assembly may be an ABS or EBS valve in the brake system of a vehicle in which the control states may apply, hold or release fluid pressure from the working volume which, in this case, comprises a vehicle brake.

BACKGROUND OF THE INVENTION

Such a valve assembly is disclosed in International Patent application no. WO03/031855, and comprises a valve body in which are mounted two pressure responsive pistons, one of which is mounted inside the other, and two return springs, one of which extends between the valve body and the outer piston, and the other of which is located in a chamber inside the outer piston and extends between the outer and inner pistons. An axially extending central aperture is provided through both pistons to allow flow of fluid from a valve assembly inlet into the chamber inside the outer piston and above the inner piston, and into a control chamber above the outer piston.

The valve assembly is of relative complex construction, and the parts must be manufactured to a close tolerance to ensure that fluid tight seals can be provided where required whilst allowing the necessary movement of the two pistons, in particular the two pistons must be manufactured to a close tolerance to ensure that a fluid tight seal is provided between the inner and outer pistons whilst allowing relative movement between the two pistons. Moreover, the presence of two return springs in the valve assembly further complicates manufacture of the valve assembly, as one return spring must be inserted into the chamber between the two pistons, and performance of the valve assembly depends partly on the performance of two return springs. In addition, maintenance of the valve assembly is inconvenient because the chamber inside the outer piston in which one of the return springs is located cannot be accessed, for example to check that the seal between the two pistons is adequate and sufficiently well lubricated, or to check or replace the return spring, without dismantling the entire valve assembly.

It is specified that the valve assembly described in WO03/031855 is suitable for use as either an ABS or and EBS valve in a vehicle brake system, but this valve assembly is, in fact, more suitable for use as an ABS valve than as an EBS valve.

In normal use, an ABS valve is passive and allows flow of fluid from the valve inlet to the vehicle brake, i.e. is in the apply state. Only if wheel lock is detected is the ABS valve assembly activated to either release fluid pressure from the vehicle brake or to hold fluid pressure in the vehicle brake. The valve assembly disclosed in WO03/031855 is in the apply state when the solenoid valve is de-energised.

In contrast, an EBS valve assembly must normally be in the release state, i.e. must release fluid from the vehicle brake and block flow of fluid from a pressurised fluid reservoir through the valve inlet. Only when a driver of the vehicle demands braking is the EBS valve assembly operated to allow flow of fluid from the pressurised fluid reservoir to the vehicle brake. The valve assembly disclosed in WO03/031855 is in the release state when the solenoid valve is energised, and therefore electrical power consumption and wear on the solenoid valve would be excessive if this valve assembly were to be used as an EBS valve.

SUMMARY OF THE INVENTION

According to a first aspect of the invention we provide a valve assembly, the valve assembly comprising a valve body, a first movable pressure responsive element, and a second pressure responsive movable element, the valve body being provided with a first port, a second port and a third port, the first pressure responsive element being moveable into engagement with a first valve seat substantially to block flow of fluid between the second port and the third port, and the second pressure responsive element being movable into engagement with a second valve seat substantially to block flow of fluid between the first port and the second port, wherein the valve assembly further comprises a third movable pressure responsive element which may be moved to engage with the first pressure responsive element and move the first pressure responsive element out of engagement with the first valve seat so that flow of fluid between the second port and the third port is permitted.

By virtue of the provision of the third pressure responsive element, the provision of a sealed chamber between the first and second pressure responsive elements, is not required to facilitate movement of the first pressure responsive element with respect to the second pressure responsive element. Thus, construction and maintenance of the valve assembly is simplified.

Preferably, the first valve seat is provided on the second pressure responsive element and the second valve seat is provided on the valve body.

The valve assembly may be further provided with a resilient biasing element which extends between the valve body and the third pressure responsive element, the third pressure responsive element being configured to be capable of transmitting the biasing force of the resilient biasing element to both the first and second pressure responsive elements.

By virtue of the engagement of the resilient biasing element with the third pressure responsive element, the need to provide two separate resilient biasing elements to ensure correct operation of the valve assembly is removed. The valve assembly performance therefore does not depend on the characteristics of two resilient biasing elements.

The part may extend through an aperture provided in the second pressure responsive element, there being a substantially fluid tight seal provided between the second pressure responsive element and the third pressure responsive element which allows relative movement of the second pressure responsive element with respect of the third pressure responsive element.

The first port is preferably an inlet port, the second port an outlet port, and the third port an exhaust port.

The first pressure responsive element may be adapted to move in response to fluid pressure in a control chamber to engage with the first valve seat, and the second pressure responsive element may be adapted to move in response to fluid pressure at the inlet port to engage with the second valve seat.

The valve assembly may further comprise a conduit which extends from the inlet port to the control chamber, through a portion of the valve body which is exterior to the first and second pressure responsive elements. Thus the complexity of the first and second pressure responsive elements is reduced, as there is no need to provide an axially extending central aperture through either pressure responsive element in order to direct pressurised fluid from the inlet port to the control chamber.

The first pressure responsive element is preferably a diaphragm. Use of a diaphragm rather than a piston and O-ring assembly, reduces frictional energy losses during operation of the valve assembly.

Preferably, the valve assembly further comprises a switch valve having a first switch port connected to the inlet port of the valve assembly, a second switch port connected to the control chamber, a third switch port which vents to atmosphere, and a valve member which is movable between a first position in which the third switch port is blocked and flow of fluid from the first switch port to the second switch port is permitted, and a second position in which the first switch port is blocked and flow of fluid from the second switch port to the third switch port is permitted.

In this case, the switch valve is preferably electrically operated, supply of electrical power to the switch valve causing movement of the valve member to the first position, and the valve member moving to the second position in the absence of electrical power supply.

The switch valve may be a solenoid valve. Alternatively, the switch valve may be a piezoelectric valve.

The valve assembly may be suitable for controlling fluid pressure relative to a working volume in three control states, applying, holding or releasing fluid pressure relative to the working volume for example, in which case, the valve assembly may be an EBS valve for a vehicle braking system.

According to a second aspect of the invention we provide a vehicle braking system including a source of pressurised fluid, a vehicle brake actuator, and a valve assembly according to the first aspect of the invention, the first port being connected to the source of pressurised fluid, and the second port being connected to the vehicle brake actuator, and the third port venting to a low pressure region.

According to a third aspect of the invention we provide a valve assembly comprising an electrically operable switch valve and a main valve for controlling fluid pressure in a working volume in three control states, the main valve having an inlet port, an outlet port and an exhaust port, and the switch valve having a valve member which moves from a first position to a second position in response to supply of an electrical current to the valve, and returns from the second position to the first position following removal of the electrical current, wherein the main valve is configured such that when the valve member is in the first position flow of fluid through the inlet port is substantially prevented and flow of fluid from the outlet port to the exhaust port is permitted, and when the valve member is in the second position flow of fluid from the inlet port to the outlet port is permitted and flow of fluid between the exhaust port and either the inlet or outlet port is substantially prevented.

By virtue of this aspect of the invention, the valve assembly may be used as an EBS valve in a vehicle braking system without the need to apply an electrical current to the switch valve in order to maintain the valve assembly in its normal, release state.

BRIEF DESCRIPTION OF THE DRAWINGS

An embodiment of the invention will now be described, by way of example only, with reference to and/or as shown in the accompanying drawings of which:

FIG. 2 shows the broken away perspective view of FIG. 1, the valve being in a) a release state, b) an apply state, and c) hold state, FIG. 3 is a diagrammatic illustration of the valve assembly of FIG. 1 when in a) a release state, b) an apply state, and c) a hold state.

DETAILED DESCRIPTION OF THE INVENTION

Figure 1:
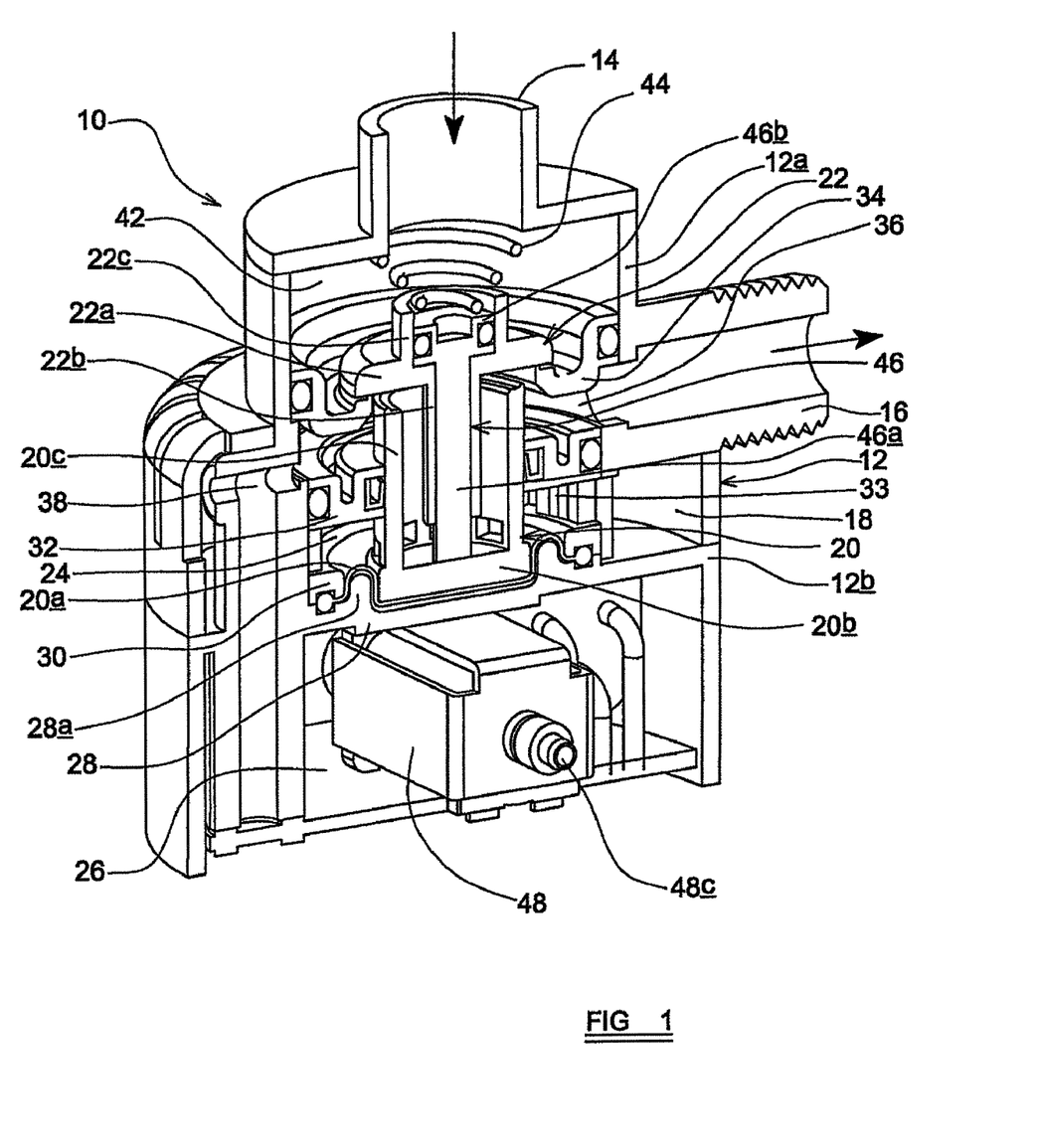
FIG. 1 is a broken away perspective view of a valve assembly according to the invention.
Figure 2A:
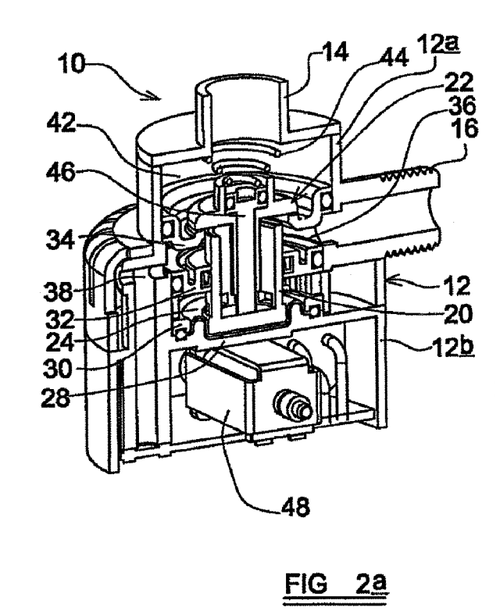
Figure 2B:
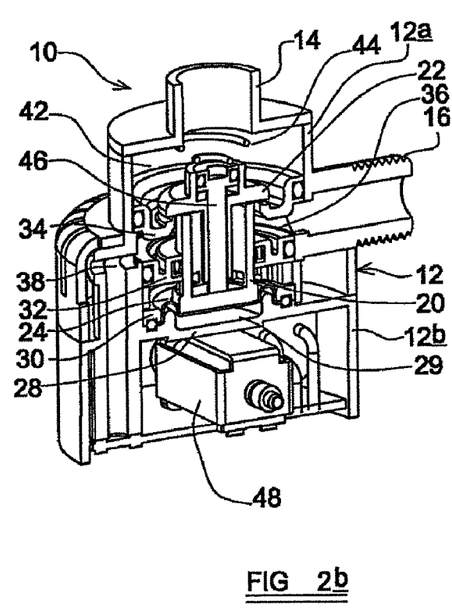
Figure 2C:
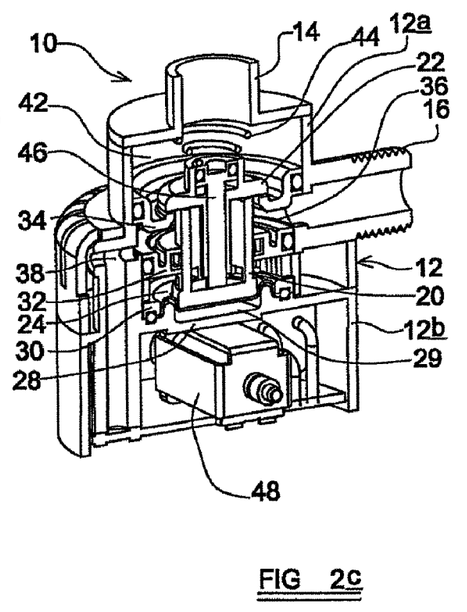
Figure 3A:
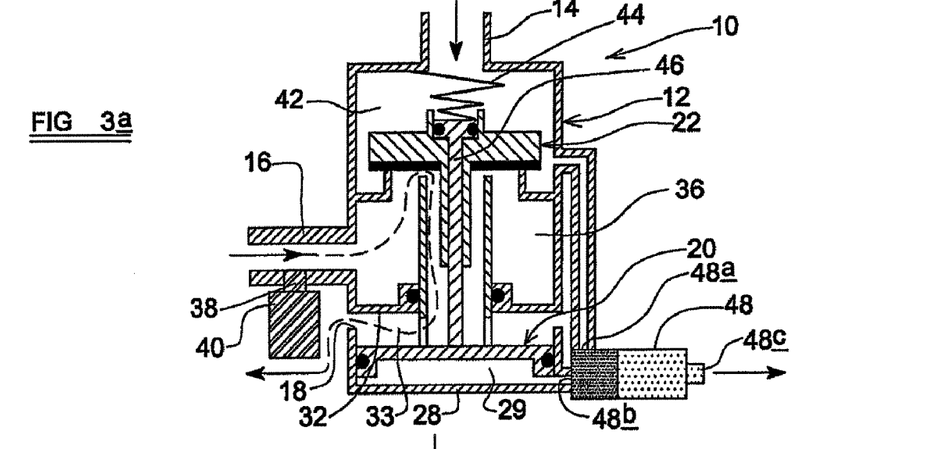
Figure 3B:
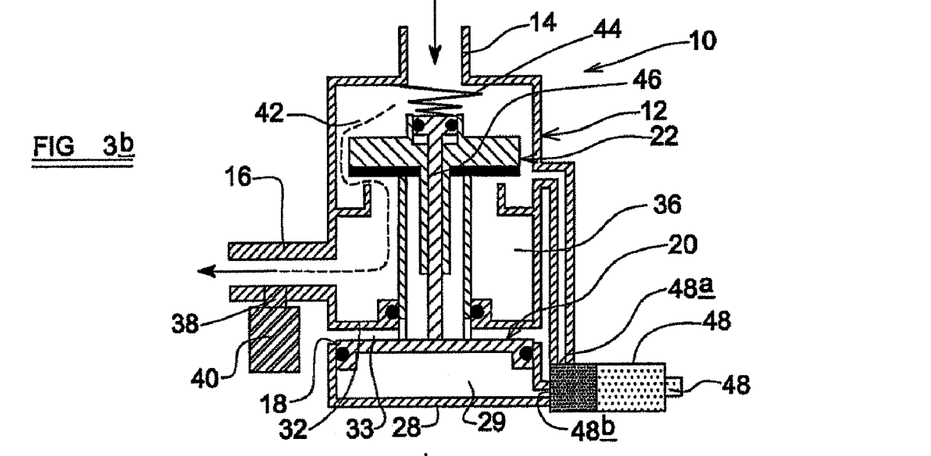
Figure 3C:
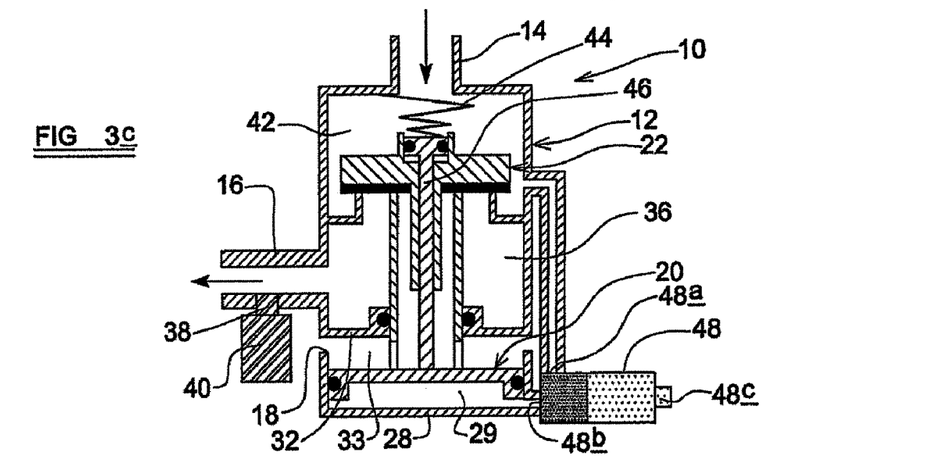

Referring now to FIGS. 1 to 3, there is shown a valve assembly 10 comprising a valve body 12 in which is provided a first port 14, a second port 16 and a third port 18. In this example, the first port 14 is an inlet port, the second port 16 is an outlet port, and the third port 18 is an exhaust chamber which is open to the atmosphere.

The valve body 12 has a first cylindrical portion 12a and a second cylindrical portion 12b of greater diameter than the first cylindrical portion 12a. The inlet port 14 is provided in an end surface of the first portion 12a of the valve body 12 and extends generally axially from the first cylindrical portion 12a. The outlet port 16 is provided in a cylindrical side wall of the valve body 12 at an interface between the first 12a and second 12b cylindrical side portions, and extends generally radially outwardly of the valve body 12. The exhaust chamber 18 is provided in the second cylindrical portion 12b of the valve body 12 and includes a plurality of openings through which the exhaust chamber 18 is vented to a low pressure region, in this example to the atmosphere.

Mounted within the valve body 12 is a first movable pressure responsive element 20, which in this example comprises a diaphragm and piston moulding, and a second pressure responsive element 22, which in this example is a piston. It will be appreciated that both pressure responsive elements could be pistons, but use of a diaphragm is advantageous as it minimises frictional losses during movement of the first pressure responsive element 20 with respect to the valve body 12.

The first pressure responsive element 20 includes a generally circular flexible membrane 20a the periphery of which is provided with a thickened rim of generally circular transverse cross-section, a generally circular end plate 20b which is mounted generally centrally of the membrane 20a and from which extends a generally cylindrical wall portion 20c.

The second portion 12b of the valve body 12 is divided into to first 24 and second 26 chambers by means of a partition plate 28, and the first pressure responsive element 20 is mounted in the first chamber 24 with the rim of the membrane 20a located in a groove provided in the periphery of the partition plate 28 and clamped between the partition plate 28 and a locking ring 30 so as to provide a substantially fluid tight seal between the membrane 20a and the valve body 12. The first chamber 24 is adjacent the first portion 12b of the valve body 12 and the wall portion 20c of the first pressure responsive member extends into the first portion 12b of the valve body 12 towards the second pressure responsive element 22. The partition plate 28 is provided with a generally circular ridge 28a which, when the first pressure responsive element 20 engages with the partition plate 28, surrounds the end plate 20b, and which provides a support for the membrane 20a.

When the first pressure responsive element 20 moves out of engagement with the partition plate 28, there is a control chamber 29 between the partition plate 28 and the membrane 20a of the first pressure responsive element 20.

An annular sealing ring 32 is mounted in the first chamber 24 of the second portion 12b of the valve body 12, around the wall portion 20c of the first pressure responsive element 20. An O-ring is mounted in an outer surface of the sealing ring 32 and engages with the valve body 12, and a lip seal is mounted in an inner surface of the sealing ring 32 and engages with the wall portion 20c of the first pressure responsive element 20. The sealing ring 32 thus provides a substantially fluid tight seal between the valve body 12 and the first pressure responsive element. The sealing ring 32 is fixed relative to the valve body 12, but the lip seal permits the first pressure responsive element 20 to move with respect to the sealing ring 32 whilst providing a substantially fluid tight seal.

The membrane 20a of the first pressure response element 20 and the sealing ring 32 are arranged such that the exhaust port 18 extends from the valve body 12 between the membrane 20a and the sealing ring 32. The membrane 20a and sealing ring 32 thus enclose an exhaust chamber 33. Apertures are provided in the wall portion 20c of the first pressure responsive element 20 adjacent the end plate 20b, and these provide a conduit for fluid within the wall portion 20c to pass into the exhaust chamber 33.

The second pressure responsive element 22 is mounted in the first portion 12a of the valve body and comprises a generally annular plate 22a from opposite sides of which extend first 22b and second 22c generally cylindrical tube formations. The first tube formation 22b has a smaller diameter than the second 22c, and extends towards the first pressure responsive element 20 into the space enclosed by the wall portion 20c of the first pressure responsive element. The second tube formation 22c extends towards the inlet port 14. The annular plate 22a, and first 22b and second 22c tube formations are all arranged coaxially of the valve body 12.

A valve seat formation 34 extends radially inwardly from the first portion 12a of the valve body 12, and provides a generally circular ridge at its inner edge with which the annular plate 22a of the second pressure responsive element 22 may engage. In this example, the valve seat formation 34 is separate from the valve body, and an O-ring is used to provide a substantially fluid tight seal between the valve body 12 and the valve seat formation 34. It should be appreciated, however, that the valve seat formation 34 may be integral with the valve body 12.

The valve seat formation 34 and sealing ring 32 are arranged such that the outlet port 16 extends from between the valve seat formation 34 and sealing ring 32. The valve seat formation 34 and sealing ring 32 thus enclose a delivery chamber 36. In addition to the outlet port 16, there is provided a pressure take off conduit 38 through the valve body 12 from the delivery chamber 36. The pressure take off conduit 38 extends to pressure sensor 40, which in this example is mounted on an electronic circuit board of an electronic valve controller 49, and thus enables the pressure in the delivery chamber 36 to be measured.

An inlet chamber 44 is formed between the valve seat formation 34 and the plate 22a of the second pressure responsive element 22 and the end plate of the first portion 12a of the valve body 12 through which the inlet port 14 extends.

The valve assembly further comprises a resilient biasing element 44, which in this example is a frusto-conical helical compression spring, and a third pressure responsive element 46, which in this example comprises a rod 46a with a generally circular transverse cross section, at one end of which is provided a stop portion 46b in the form of a disc of greater diameter than the transverse cross section of the rod 46a, mounted coaxially of the rod 46a.

The rod 46a of the third pressure responsive element 46 has a diameter which is slightly smaller than the internal diameter of the first tube formation 22b of the second pressure responsive element 22, and extends through the space enclosed by the first tube formation 22b to engage with the end plate 20b of the first pressure responsive element 20. The stop portion 46b has a diameter which is slightly smaller than the internal diameter of the second tube formation 22c of the second pressure responsive element 22, and is located in the space enclosed by the second tube formation 22c. A sealing element, in this case an O-ring, is located in a groove around an outer edge surface of the stop portion 46b and engages with an inner surface of the second tube formation 22c to provide a substantially fluid tight seal whilst still permitting movement of the biasing force transmitting rod 46 with respect to the second pressure responsive element 22.

The spring 44 extends from the end plate of the valve body 12 around the inlet port 14 to the stop portion 46b of the biasing force transmitting rod 46.

The valve assembly 10 further comprises a switch valve 48, which in this example is a solenoid valve. The switch valve 48 may, of course, be any other type of electrically operated valve such as a piezoelectric valve, for example. The solenoid valve 48 is located in the second chamber 26 of the second portion 12b of the valve body 12 and is provided with three ports and a valve member which is movable under the action of a solenoid between a first and second position. The first port of the solenoid valve 48 is connected to the inlet chamber 42 and thus forms the inlet port, the second port is connected to the control chamber 29 and thus forms the control port, and the third port is vented to a low pressure region, in this example to the atmosphere, and thus forms a solenoid exhaust port.

When in the first position, the valve member substantially prevents fluid from passing through the exhaust port whilst permitting fluid to pass between the inlet and control ports, and when in the second position, the valve member substantially prevents flow of fluid through the inlet port whilst permitting fluid to pass between the control and exhaust ports. In this example, the valve 48 is configured such that passage of an electrical current through the solenoid causes the valve member to move to the first position, the valve member returning to the second position on removal of the electrical power supply to the solenoid.

An electronic valve controller 49 is provided to control electrical power supply to the solenoid valve 48, and is typically mounted on the exterior of the valve body 12 adjacent the solenoid valve 48. The pressure sensor 40 is connected to the electronic valve controller 49, so that the measured delivery pressure may be fed back to the controller 49 so that the controller 49 may respond appropriately to bring the delivery pressure to a desired valve.

Where the inlet port 14 of the valve assembly 10 is connected to a source of pressurised fluid, the valve assembly 10 may be operated to control the fluid pressure in a working volume connected to the outlet port 16 in three control states, namely to apply pressure to the working volume, to hold fluid pressure in the working volume, or to release fluid pressure from the working volume. In this case, the valve assembly 10 operates as follows.

As mentioned above, the inlet port 14 is connected to a source of pressurised fluid and thus the inlet chamber 42 is filled with pressurised fluid from that source. The pressure of fluid in the inlet chamber 42 together with the biasing force of the spring 44, which is transmitted to the second pressure responsive element 22 by engagement of the stop portion 46b of the third pressure responsive element 46 with the plate 22a of the second pressure responsive element 22, push the plate 22a against the valve seat formation 34 so that fluid flow from the inlet chamber 42 past the valve seat formation 34 is not permitted. If no electrical power is supplied to the solenoid valve 48, the valve member of the solenoid valve 48 adopts the second position, and thus flow of pressurised fluid from the inlet chamber through the solenoid valve 48 is not permitted. In other words, the valve assembly 10 is acting to block flow of fluid from the source of pressurised fluid.

The rod portion 46a of the third pressure responsive element 46 engages with the end plate 20b of the first pressure responsive element 20 and pushes the end plate 20b towards the partition 28. With the valve member in the second position, flow of fluid through the control and exhaust ports of the solenoid valve 48 is permitted and the control chamber 29 contains fluid at atmospheric pressure. The pressure of fluid in the inlet chamber 42 acting on the stop portion 46b of the third pressure responsive element 46 and the biasing force of the spring 44 provide sufficient force that movement of the first pressure responsive element 20 to engage with the partition plate 28 to minimise the volume of the control chamber 29 is not resisted by fluid pressure in the control chamber 29.

The wall portion 20c of the first pressure responsive element 20 is of a length such that when the third pressure responsive element 46 pushes the first pressure responsive element 20 to minimise the volume of the control chamber 42, there is a gap between the wall portion 20c of the first pressure responsive element 20 and the plate 22a of the second pressure responsive element 22. Fluid flow from the delivery chamber 36, and hence the working volume, into the space enclosed by the wall portion 20c, through the apertures in the wall portion 20c into the exhaust chamber 33 is therefore permitted. In other words, there is a path for free flow of fluid between the outlet port 16 and the exhaust port 16 of valve assembly, and thus the valve assembly 10 is acting to release any fluid pressure in the working volume.

The valve assembly 10 is thus in the control state in which it releases fluid pressure from the working volume, i.e. release state, as illustrated in FIGS. 2a and 3a.

If electrical power is supplied to the solenoid valve 48, the valve member moves to the second position, whereby flow of fluid through the exhaust port 48c of the solenoid valve 48 is prevented, and flow of pressurised fluid from the inlet chamber 42 to the control chamber 29 is permitted. As fluid pressure in the control chamber 29 increases, the fluid pressure pushes the end plate 20a of the first pressure responsive element 20 against the biasing force of the spring 44. When fluid pressure in the control chamber 42 is sufficiently high to overcome the biasing force of the spring 44, the first pressure responsive element 20 moves towards the second pressure responsive element 22 until the wall formation 20c engages with the plate 22a of the second pressure responsive element 22, thus substantially preventing flow of fluid between the delivery chamber 36 and the exhaust chamber 33.

The area of the end plate 20b of the first pressure responsive element 20 is greater than the area of the plate 22a of the second pressure responsive element, to that when the fluid pressure in the control chamber 29 is equal to the fluid pressure in the inlet chamber 42 the force exerted on the first pressure responsive element 20 to push the second pressure responsive element 22 away from the valve seat formation 34 is greater than the force acting on the second pressure responsive element 22 to maintain it in contact with the valve seat formation 34. Thus, when the fluid pressure in the control chamber 42 reaches the same value as the fluid pressure in the inlet chamber 42, the first pressure responsive element 20 pushes the plate 22a of the second pressure responsive element 22 out of engagement with the valve seat formation 34, thus opening a path for flow of fluid from the inlet chamber 42 into the delivery chamber 36. Fluid from the source of pressurised fluid may therefore flow through the valve assembly 10 and out of the outlet port 16.

The valve assembly 10 is thus in the control state in which it applies fluid pressure to the working volume, i.e. an apply state, as illustrated in FIGS. 2b and 3b.

The third control state in which fluid pressure in the working volume is maintained, is achieved by applying a fluctuating electrical signal to the solenoid valve 48.

If electrical power to the solenoid valve 48 is switched on and off rapidly, for example at 50 Hz and typically in the range of 25 to 100 Hz, fluid pressure is repeatedly applied to and released from the control chamber 29. The fluid pressure in the control chamber 29 reaches an equilibrium pressure between atmospheric pressure and the fluid pressure in the inlet chamber 42.

The biasing force of the spring 44 is sufficiently weak that it is overcome by this intermediate control chamber fluid pressure, and thus the first pressure responsive element 20 moves towards the second pressure responsive element 22 until the wall formation 20c engages with the plate 22a of the second pressure responsive element 22, thus substantially preventing flow of fluid between the delivery chamber 36 and the exhaust chamber 33. As the pressure of fluid in the control chamber 29 is lower than the fluid pressure in the inlet chamber 42, the first pressure responsive element 20 cannot move the second pressure responsive element 22 out of engagement with the valve seat formation 34, and thus the path for fluid flow from the inlet chamber 42 to the delivery chamber 33 remains substantially closed.

The valve assembly 10 is thus in the control state in which it maintains fluid pressure in the working volume, i.e. a hold state, as illustrated in FIGS. 2c and 3c.

Figure 4:
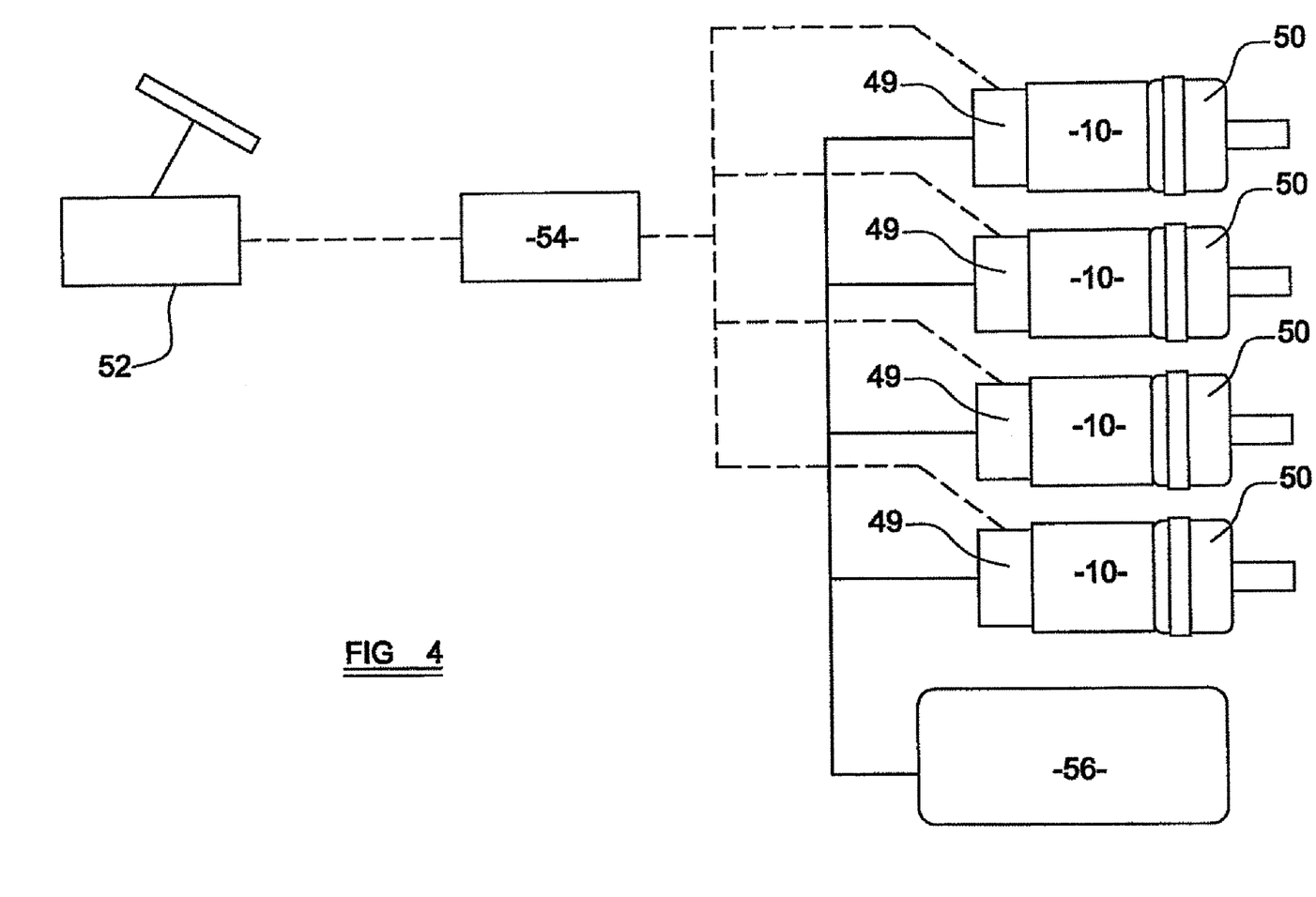
FIG. 4 is a schematic illustration of a vehicle braking system incorporating the valve assembly of FIG. 1.

The valve assembly 10 may be used as an EBS valve in a vehicle braking system. In this case, the valve assembly 10 is used to supply pressurised fluid to one or more brake actuators 50 to facilitate movement of the vehicle brakes in response to demand for braking from a driver of the vehicle. Such a braking system is illustrated in FIG. 4.

This braking system comprises four brake actuators 50, one for each vehicle wheel or set of wheels, and four valve assemblies 10, the outlet port 16 of each valve assembly 10 being connected to one of the brake actuators 50.

Preferably each valve assembly 10 is mounted adjacent its respective brake actuator 50, on an exterior surface of the brake actuator 50 housing. The brake actuators 50 are configured such that supply of pressurised fluid from the outlet port 16 of each valve assembly 10 to the actuator 50 causes the brakes to be applied.

The braking system further comprises a foot pedal 52 which may be operated by the driver to initiate braking, an electronic central controller 54 which is electrically connected to the foot pedal and to the electronic valve controller 49 of each valve assembly 10, and a pressurised fluid reservoir 56 which is connected to the inlet ports 14 of each valve assembly 10 and which typically contains compressed air at a pressure of around 8-10 bar.

Movement of the foot pedal 52 generates an electrical demand signal, the magnitude of which indicates the degree of braking desired. The demand signal is passed to the central controller 54 which uses a pre-programmed control algorithm to generate an appropriate electrical control signal. The control signal is transferred to each valve controller 49 which supplies an electrical current to the associated solenoid valve 48 to bring the valve assembly 10 into the apply or hold states as described above.

The valve assembly 10 described above is particularly suitable for use an EBS valve because the valve assembly 10 is configured to return to the exhaust state, in which no pressurised fluid is supplied to the brake actuator 50, when no electrical power is supplied to the solenoid valve 48.

It should be appreciated that the valve assembly 10 described above could be used as an ABS valve in a vehicle braking system, although as an ABS valve is normally held in the build state, so that the ABS valve permits fluid pressure generated at the foot pedal to be transferred to the brake actuator 50 to initiate braking, it would normally be necessary to supply electrical power to the solenoid valve 48. Thus, if the valve assembly 10 described above were to be used as an ABS valve, it would be preferable to effectively reverse the action of the solenoid valve 48, so that the valve member moves to the second position when energised and returns to the first position when deenergised.

Similarly, whilst the valve assembly described in WO03/031855 is particularly suitable for use as an ABS valve, it may be improved for use as an EBS valve, for example in the EBS braking system described above and as shown in FIG. 4, by reversing the solenoid valve so that the valve assembly is in the exhaust state when the solenoid is de-energised.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A valve assembly comprising a valve body, a first movable pressure responsive element, and a second moveable pressure responsive element, the valve body being provided with an inlet port, an outlet port and an exhaust port, the first pressure responsive element being moveable into engagement with a first valve seat to substantially block flow of fluid between the outlet port and the exhaust port, and the second pressure responsive element being movable into engagement with a second valve seat to substantially block flow of fluid between the inlet port and the outlet port, wherein the valve assembly further comprises a third movable pressure responsive element which may be moved to engage with the first pressure responsive element and move the first pressure responsive element out of engagement with the first valve seat so that flow of fluid between the outlet port and the exhaust port is permitted, wherein the first pressure responsive element is adapted to move in response to fluid pressure in a control chamber to engage with the first valve seat and the second pressure responsive element is adapted to move in response to fluid pressure at the inlet port to engage with the second valve seat, and wherein the valve assembly further comprises a switch valve having a first switch port connected to the inlet port of the valve assembly, a second switch port connected to the control chamber, a third switch port which vents to atmosphere, and a valve member which is movable between a first position in which the third switch port is blocked and flow of fluid from the first switch port to the second switch port is permitted, and a second position in which the first switch port is blocked and flow of fluid from the second switch port to the third port is permitted.

2. A valve assembly according to claim 1 wherein the switch valve is electrically operated, supply of electrical power to the switch valve causing movement of the valve member to the first position, and the valve member moving to the second position in the absence of electrical power supply.

3. A valve assembly according to claim 2 wherein the switch valve is a solenoid valve.

4. A valve assembly according to claim 2 wherein the switch valve is a piezoelectric valve.

5. A valve assembly according to claim 1 wherein the valve assembly is suitable for controlling fluid pressure relative to a working volume in three control states, applying, holding or releasing fluid pressure relative to the working volume.

6. A valve assembly according to claim 5 wherein the valve assembly is an EBS valve for a vehicle braking system.

7. A valve assembly according to claim 1 wherein the first valve seat is provided on the second pressure responsive element and the second valve seat is provided on the valve body.

8. A valve assembly according to claim 1 wherein the valve assembly is further provided with a resilient biasing element which extends between the valve body and the third pressure responsive element, the third pressure responsive element being configured to be capable of transmitting the biasing force of the resilient biasing element to both the first and second pressure responsive elements.

9. A valve assembly according to claim 1 wherein the third pressure responsive element extends through an aperture provided in the second pressure responsive element, there being a substantially fluid tight seal provided between the second pressure responsive element and the third pressure responsive element which allows relative movement of the second pressure responsive element with respect to the third pressure responsive element.

10. A valve assembly according to claim 1 wherein the valve assembly further comprises a conduit which extends from the inlet port to the control chamber, through a portion of the valve body which is exterior to the first and second pressure responsive elements.

11. A valve assembly according to claim 1 wherein the first pressure responsive element comprises a diaphragm.

12. A vehicle braking system including a source of pressurised fluid, a vehicle brake actuator, and a valve assembly comprising a valve body, a first movable pressure responsive element, and a second movable pressure responsive element, the valve body being provided with an inlet port, an outlet port and an exhaust port, the first pressure responsive element being moveable into engagement with a first valve seat to substantially block flow of fluid between the outlet port and the exhaust port, and the second pressure responsive element being movable into engagement with a second valve seat to substantially block flow of fluid between the inlet port and the outlet port, wherein the valve assembly further comprises a third movable pressure responsive element which may be moved to engage with the first pressure responsive element and move the first pressure responsive element out of engagement with the first valve seat so that flow of fluid between the outlet port and the exhaust port is permitted, the inlet port being connected to the source of pressurised fluid, and the outlet port being connected to the vehicle brake actuator, and the exhaust port venting to a low pressure region, wherein the first pressure responsive element is adapted to move in response to fluid pressure in a control chamber to engage with the first valve seat and the second pressure responsive element is adapted to move in response to fluid pressure at the inlet port to engage with the second valve seat, and wherein the valve assembly further comprises a switch valve having a first switch port connected to the inlet port of the valve assembly, a second switch port connected to the control chamber, a third switch port which vents to atmosphere, and a valve member which is movable between a first position in which the third switch port is blocked and flow of fluid from the first switch port to the second switch port is permitted, and a second position in which the first switch port is blocked and flow of fluid from the second switch port to the third port is permitted.

* * * * *